United States Patent [19]
Hofmann et al.

[11] Patent Number: 5,433,123
[45] Date of Patent: Jul. 18, 1995

[54] MEASURING AND TRANSMITTING SYSTEM FOR POSITION GYROS

[75] Inventors: Fritz Hofmann; Ernst Gruber, both of München, Germany

[73] Assignee: Deutsche Aerospace AG, Munich, Germany

[21] Appl. No.: 182,549

[22] Filed: Jan. 18, 1994

[30] Foreign Application Priority Data

Jan. 16, 1993 [DE] Germany ............... 43 01 040.7

[51] Int. Cl.⁶ .................. G01C 19/28; G01C 19/32
[52] U.S. Cl. ............................. 74/5.6 E; 73/505
[58] Field of Search ............. 74/5.6 E, 5.6 R, 5.46; 73/505, 504

[56] References Cited

U.S. PATENT DOCUMENTS

| | | | |
|---|---|---|---|
| 3,490,297 | 1/1970 | Brodersen | 74/5.46 |
| 3,587,330 | 6/1971 | Deer | 74/5.6 R |
| 4,240,301 | 12/1980 | Mason | 74/5.6 E X |
| 4,297,883 | 11/1981 | Shannon | 73/504 |
| 4,316,389 | 2/1982 | Shannon | 73/504 |

*Primary Examiner*—Rodney H. Bonck
*Attorney, Agent, or Firm*—Evenson McKeown Edwards & Lenahan

[57] ABSTRACT

A measuring and transmitting system of measuring signals for the deflection of an interior frame angle of a position gyro cardanically mounted in an exterior housing, in which the position gyro has an interior frame and an exterior frame, is provided with a gyro rotor and a permanent magnet in the gyro rotor. The permanent magnet forms a signal generator of the interior frame, and has a magnetic field generator center. A plurality of measuring coils form a signal receiver formed on the exterior frame, the measuring coils having measuring axes aligned in parallel to one another and eccentrically with respect to the magnetic field generator center. An analysis unit is connected behind the measuring coils and performs a measuring signal analysis.

8 Claims, 2 Drawing Sheets

MEASURING AND TRANSMITTING SYSTEM FOR POSITION GYROS

BACKGROUND AND SUMMARY OF THE INVENTION

The present invention relates to a measuring and transmitting system of measuring signals for the deflection of the interior frame angle of a position gyro cardanically mounted in an exterior housing.

Systems of the above-described general type are known. In the prior art, the basic construction of a cardanic mounting of a position gyro arranges a sensing system in the interior frame which measures the interior frame angle α. The energy supply for this sensing system and the obtained measuring signal for the interior frame angle α in this case must be transmitted by way of the mounting of the exterior frame on the exterior housing to this exterior housing, for example, by means of a slip ring set with at least three channels. The three channels are provided, for example, for the energy supply, the measuring signal and the return line. The demands on such a measuring and transmitting system are naturally high and, on the one hand, require the avoidance of frictional or other reaction forces in the cardanic mounting and, on the other hand, a high resistance to disturbances and to aging. Naturally, the whole construction should be simple in this case and have low piece costs, and there should also be no system-caused rough quantization as, for example, an on/off characteristic of the measuring signal for the interior frame angle. Furthermore, a comprehensive measuring range must exist for the interior frame angle α as well as a continuous availability of the interior frame angle measuring signal in any position of the exterior frame angle Ψ.

The meeting of all these requirements, particularly of the first-mentioned requirements, is very difficult to implement because, on the one hand, contact precision slip rings are very expensive and can nevertheless not avoid a friction momentum. In addition, they are very sensitive to aging when they are inoperative. However, it is a particular disadvantage that the generated friction momentum causes an absolutely undesirable gyro drift K (=friction momentum/angular momentum of the rotor). On the other hand, when no-contact transmitting devices are used, a high-expenditure installation geometry is required as well as an electronic system requiring equally high expenditures.

In order to no longer use slip rings, the sensing system on the interior frame may be replaced by two other functional groups, for example, by the signal generator on the interior frame and the signal receiver on the exterior frame. However, in this case the slip ring set is not completely eliminated because there is still, for example, the energy supply for the signal generator. Therefore, the above-mentioned disadvantages cannot be eliminated as required, and new complications may arise concerning the installation geometry, the operation in the case of different exterior frame angles Ψ as well as signal shading.

Attempts have been made to implement sensing systems with passive functional groups on the interior frame, optical reflectors being used in these attempts. However, because of their complex installation geometry, these systems have a very narrow functional range.

An object of the present invention is to provide a measuring and transmitting system of the initially mentioned type which operates without a slip ring, does not cause any disturbing reaction forces in the cardanic mounting and eliminates the disadvantages of the prior art. This and other objects are achieved by the present invention which provides a measuring and transmitting system of measuring signals for the deflection of an interior frame angle of a position gyro cardanically mounted in an exterior housing, the position gyro having an interior frame and an exterior frame, comprising a gyro rotor, a permanent magnet in the gyro rotor, the permanent magnet forming a signal generator of the interior frame, and having a magnetic field generator center, a plurality of measuring coils forming a signal receiver formed on the exterior frame, the measuring coils having measuring axes aligned in parallel to one another and eccentrically with respect to the magnetic field generator center, and an analysis unit connected behind the measuring coils and which performs a measuring signal analysis.

Other objects, advantages and novel features of the present invention will become apparent from the following detailed description of the invention when considered in conjunction with the accompanying drawings.

DETAILED DESCRIPTION OF THE DRAWINGS

Figure 1:
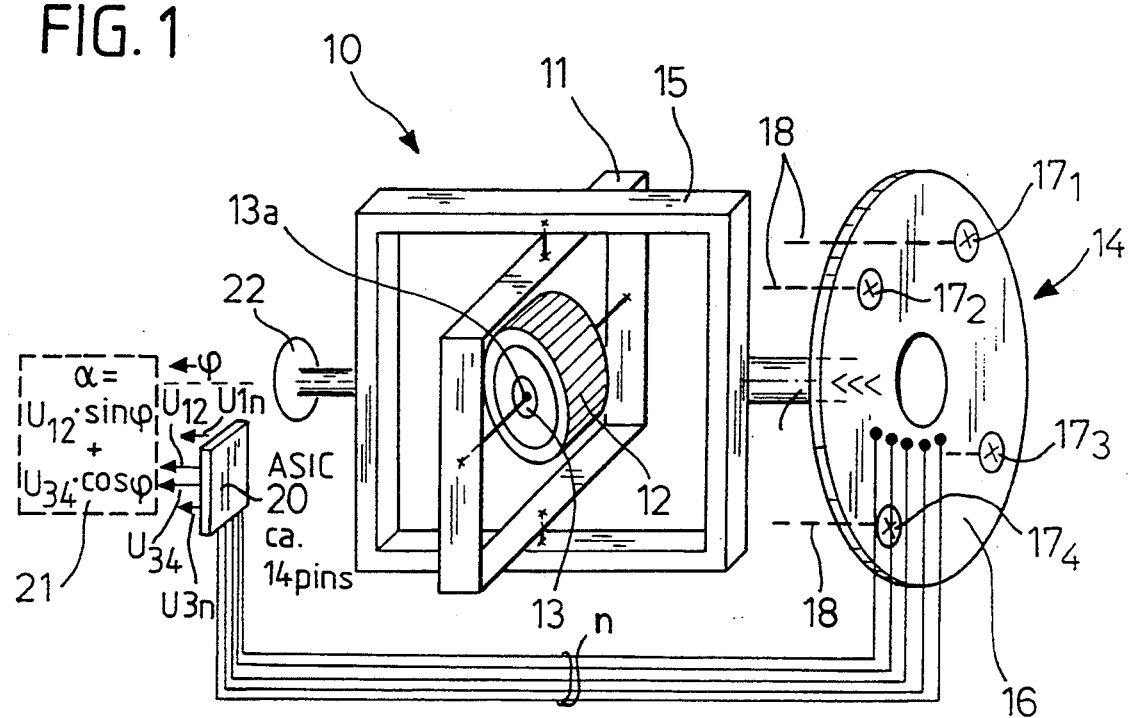
FIG. 1 is a perspective representation of an embodiment of the present invention having a permanent magnet in the gyro rotor and several measuring coils in the exterior frame.

In the embodiment of a measuring and transmitting system illustrated in FIG. 1 for detecting the interior frame angle, the signal generator on the interior frame 11 is provided in the form of a permanent magnet 13 mounted in the gyro rotor 12. After the start of the rotor 12, for example, by fuel gas or by a spring, the magnet 13 generates a strongly pulsating magnetic field as the signal generator and, in this case, requires no energy supply via slip rings. As illustrated in FIG. 1, several measuring coils 17 are arranged as so-called signal receivers on the exterior frame 15 which preferably are mounted on a carrier plate 14 in such a manner that the measuring axes 18 are parallel with respect to one another and are aligned eccentrically to the center of the magnetic field generator 13.

The thus constructed system has a simple construction which is suitable for large piece numbers and, because of the relatively high signal level and because the alternating modulation of the measuring signal is very insusceptible to disturbances, particularly with respect to low-frequency interferences and zero-point shifts of the component parameters.

Figure 2:
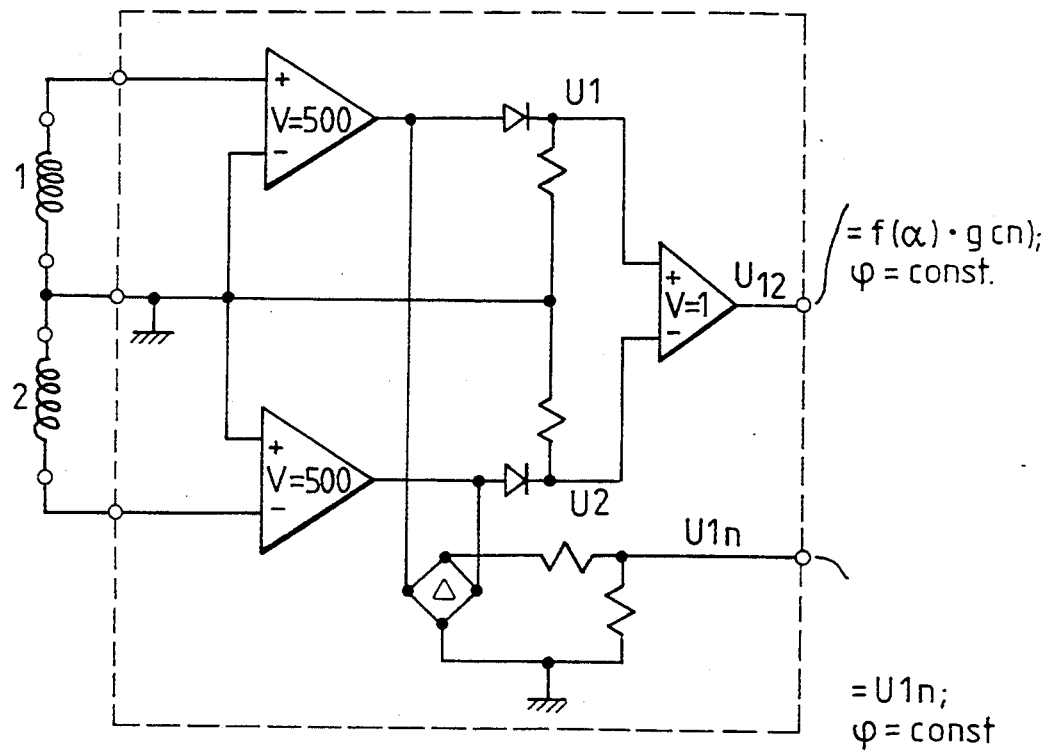
FIG. 2 is a wiring diagram for the base circuit for the analysis of the measured voltages of a coil pair according to an embodiment of the present invention.

In a simplified manner FIG. 2 shows, for a constant exterior frame angle Ψ, an embodiment for the analysis of the measuring signal of two mutually opposite measuring coils $17_1$, $17_2$ in the ASIC 20 connected behind them. The principle suggested here, specifically to first rectify the measuring voltages and then subtract them, saves the expenditure of a phase-sensitive demodulator. The measuring voltages of the coils $17_1$, $17_2$ are first amplified separately, are then rectified and then subtracted from one another. This results in the differential voltage $u_{1,2}$ as a function of the interior frame angle $\alpha$, as well as of the rotational speed n of the rotor 12 (in this example, the exterior frame angle $\Psi$ is specified to be constant). In this case, the zero point of the differential voltage $u_{1,2}$ is largely independent of the rotational speed, while the sensitivity of the measuring characteristic, with the factor $g_{(n)}$, is dependent of the rotational speed. However, the comparison voltage formed from the sum of the coil voltages permits a mathematical compensation of the influence of the rotational speed in the further signal processing.

Two coil pairs $17_3$, $17_4$ are used for finding the interior frame angle at any exterior frame angle $\Psi$. In this case, the interior frame angle $\alpha$ is calculated by the multiplication with the "sine" or "cosine" of the exterior frame angle $\Psi$ (axis transformation). The signal for the exterior frame angle $\Psi$ required for this purpose may be obtained by any one of the known sensing systems. In this case also, slip rings are not required because the sensing system is supported directly on the exterior frame. Thus, for example, in the case of four measuring coils (as shown), and without taking into account the above-described rotational speed compensation, the following is obtained:

$u_m$, $u_2$, $u_3$, $u_4$ = rectified coil voltages $u_{1,2} = u_1 - u_2$, $u_{3,4} = u_3 - u_4$ = differential voltages $u_x = u_{1,2} * \cos \Psi + u_{3,4} * \sin \Psi$ = axis transformation, wherein $u_x$ is the measurement for the interior frame angle $\alpha$.

As interfaces for a possible digitizing of the measuring signals for the further signal processing, alternatively, four analog-to-digital converter channels respectively are used. Commercially available single-chip microcontrollers with four low-frequency analog-to-digital converter channels may be used without any problems. For example, in the embodiment according to FIG. 1, the following are provided: an ASIC-chip for the signal amplification, rectification, differential voltages and comparison voltages; and a program section in the digital signal analysis of the user system connected behind it.

Figure 3:
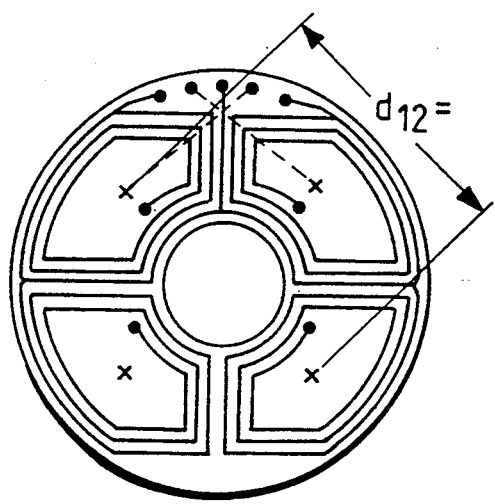
FIG. 3 is a schematic diagram of the arrangement of four spiral-shaped coils with measuring axes which are parallel to one another, constructed in accordance with an embodiment of the present invention.
Figure 4:
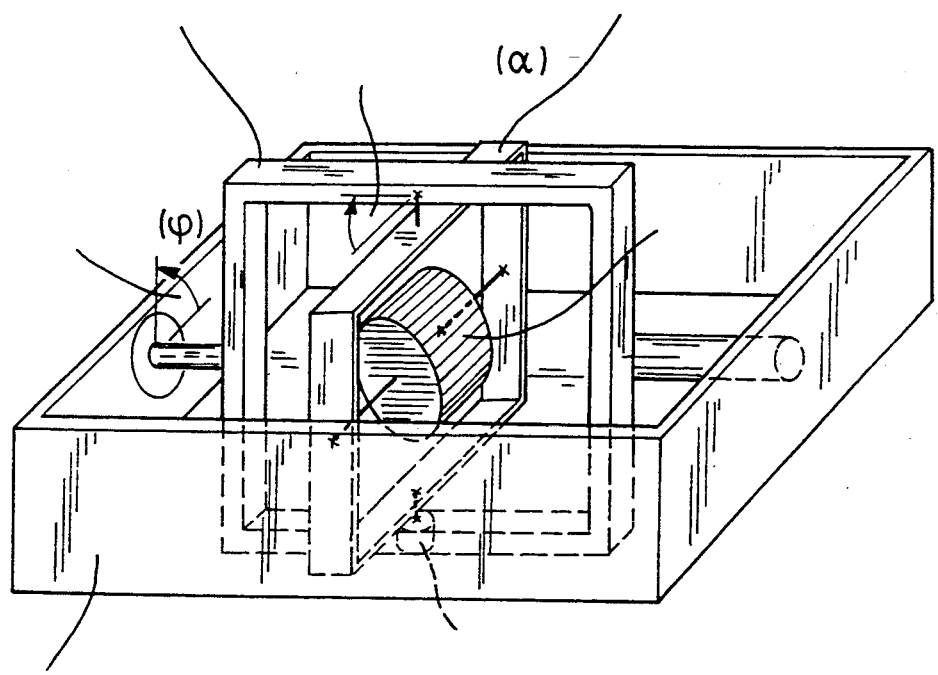
FIG. 4 is a perspective representation of a measuring system according to prior art with a cardanic mounting of the position gyro and the sensing of the interior frame angle α.

FIG. 3 illustrates an implementation embodiment for the coil arrangement illustrated in FIG. 1, in which four coils are provided on a common carrier. A significant simplification of the overall system is obtained when, in the case of a rolling carrier, the system requires, instead of a signal for the interior frame angle $\alpha$, only an axis-related signal $u_y = \alpha \sin \Psi$. The reason is that $u_{1,2} = \alpha * \sin \Psi * g_{(n)}$ may be used directly as the measuring signal, without the use of a transformation and retransformation by means of the roll angle and the second coil pair $u_3$, $u_4$.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A measuring and transmitting system of measuring signals for the deflection of an interior frame angle of a position gyro cardanically mounted in an exterior housing, the system comprising:
   an interior frame and an exterior frame for the position gyro;
   a gyro rotor of the position gyro;
   a permanent magnet arranged in and rotating with the gyro rotor, the permanent magnet forming a signal generator of the interior frame, and having a magnetic field generator center;
   a plurality of measuring coils forming a signal receiver formed on the exterior frame, the measuring coils having measuring axes aligned in parallel to one another and eccentrically with respect to the magnetic field generator center; and
   an analysis unit connected behind the measuring coils and which performs a measuring signal analysis.

2. A system according to claim 1, further comprising a common carrier plate on which the measuring coils are arranged.

3. A system according to claim 2 wherein the analysis unit includes means for individually amplifying voltages of the measuring signals, subsequently rectifying the amplified voltages, and subtracting the rectified, amplified voltages from one another.

4. A system according to claim 3, wherein the analysis unit further includes means for adding the amplified voltages of the measuring signals to form a sum signal, and further comprising means for compensating for an influence of the rotational speed, using the sum signal.

5. A system according to claim 4, further comprising a sensing system supported directly on the exterior frame, said sensing system obtaining a signal for the exterior frame angle.

6. A system according to claim 5, wherein the analysis unit has four analog-to-digital converter channels respectively, forming interfaces for digitizing of the measuring signals.

7. A system according to claim 1, wherein four of the plurality of measuring coils are provided, having mutually parallel axes and arranged on a carrier plate fastened to the exterior frame, the measuring coils being spiral-shaped.

8. For use in a measuring and transmitting system of measuring signals for measuring a deflection of an interior frame angle of a position gyro cardanically mounted in an exterior housing, the method comprising the step of: replacing a measuring signal for the interior frame angle $\alpha$ by an axis-related signal $u_y$ according to the formula $u_y = \alpha \cdot \sin \Psi$, wherein $\Psi$ is an exterior angle.

* * * * *